US007268899B2

(12) United States Patent
Crumly

(10) Patent No.: US 7,268,899 B2
(45) Date of Patent: Sep. 11, 2007

(54) SECURE SYSTEM FOR DELIVERY OF A FAX TO A REMOTE USER

(75) Inventor: James D. Crumly, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 877 days.

(21) Appl. No.: 10/062,019

(22) Filed: Jan. 31, 2002

(65) Prior Publication Data

US 2003/0145212 A1 Jul. 31, 2003

(51) Int. Cl.
*G06K 15/00* (2006.01)
*G06F 3/12* (2006.01)

(52) U.S. Cl. .................................. 358/1.14; 358/1.15

(58) Field of Classification Search ............. 358/1.15, 358/400, 402, 403, 405, 407, 442, 435, 434, 358/404, 1.14, 1.13; 382/115, 116, 117, 382/118, 124, 128; 713/186, 189
See application file for complete search history.

(56) References Cited

U.S. PATENT DOCUMENTS

| 5,191,611 | A | * | 3/1993 | Lang ............................ 705/53 |
| 5,461,488 | A | | 10/1995 | Witek .......................... 358/402 |
| 5,552,897 | A | * | 9/1996 | Mandelbaum et al. ....... 358/400 |
| 5,555,307 | A | | 9/1996 | Le Corre et al. ............ 380/243 |
| 5,629,981 | A | * | 5/1997 | Nerlikar ....................... 713/168 |
| 5,764,639 | A | | 6/1998 | Staples et al. ............... 370/401 |
| 6,028,679 | A | * | 2/2000 | Murphy ....................... 358/407 |
| 6,105,007 | A | * | 8/2000 | Norris .......................... 705/38 |
| 6,488,203 | B1 | * | 12/2002 | Stoutenburg et al. ........ 235/379 |
| 6,496,595 | B1 | * | 12/2002 | Puchek et al. ............... 382/124 |
| 6,845,448 | B1 | * | 1/2005 | Chaganti et al. ............. 713/166 |
| 6,917,440 | B2 | * | 7/2005 | Kondo et al. ................ 358/1.15 |
| 6,976,032 | B1 | * | 12/2005 | Hull et al. ................. 707/104.1 |

OTHER PUBLICATIONS http://www.kddva.com/intl-tra.html, "TeleWeb: Worldwide Point to Point Fax Transmission", pp. 1.
http://www.kddva.com/fxbroad.html, "TeleWeb: Fax Broadcasting", pp. 1.
http://www.kddva.com/fax-d.html, "TeleWeb: Fax on Demand", pp. 1.
http://www.faxback.com/fod/, "FaxBack Fax-On-Demand", pp. 1.
http://www.intersterinc.com/prod/benefits.html, "Interstar Technologies—LightningFAX Benefits", pp. 1-2.
https://faxcube.com/docs/tell_what.php3, "FaxCube—Tell Me More—What is FaxCube?", pp. 1.
http://www.efax.com/products/, Product Overview, "eFax.com", pp. 1-2.
http://www.actionfax.com/services.html, "ActionFax: Products and Services", pp. 1.

* cited by examiner

*Primary Examiner*—Dov Popovici

(57) ABSTRACT

A system for the remote retrieval of at least one document sent by facsimile transmission using a repository server for storing at least one document for a recipient at a location using a remote system connected to the system. Security apparatus for the system includes apparatus, such as a smartcard, to identify, to validate, and to locate a remote user of a remote system connected to the system when the user is connected to the repository server for retrieving at least one document stored by the repository server. Upon validation of identification of a user, any or all documents may be retrieved by a user.

11 Claims, 2 Drawing Sheets

SECURE SYSTEM FOR DELIVERY OF A FAX TO A REMOTE USER

FIELD OF THE INVENTION

The present invention generally relates to facsimile machines (FAX machines) and, more specifically, to a system providing remote access to servers for facsimile machines.

BACKGROUND OF THE INVENTION

Organizations worldwide rely on facsimile transmission of documents for immediate, reliable, and cost effective exchange of universally compatible documents. Currently, with an installed base of over 75 million facsimile machines worldwide, every business is expected to have at least one number for use over telephone lines for the facsimile transmission of documents. Additionally, many homes now have a facsimile machine or a personal computer having facsimile transmission capability.

According to a 1999 Pitney Bowes FAX Usage and Technology Study, conducted by the Gallup Organization, the usage of facsimile transmission is growing, and it is still dominant as the method of choice for sending documents and messages to customers and vendors. The survey also found that large and mid-size company employees use facsimile transmission for documents more than any other method of communications, regardless of document type.

The traditional facsimile transmission solution for documents of "having my FAX dial your FAX" worked well when the number of facsimile machines was somewhat limited. However, this paradigm began to fail when the number of people sending and receiving facsimile transmission of documents started to explode. One problem is that facsimile machines can be expensive and may not be totally reliable. Also, it is sometimes not cost effective to keep a facsimile machine constantly tying up a telephone line. This current system does not work properly all the time in today's demanding around-the-clock environment. One solution has been to utilize servers for facsimile transmission that receive documents sent by facsimile transmission and that route them to the desired recipient. Because these servers for facsimile transmission can support large numbers of employees, they can be made more reliable.

However, this solution did not address another problem that has arisen in this business world that has become ever more dependent on facsimile transmission of documents, and that is that many people need to be able to retrieve documents sent by facsimile transmission from locations other than their workplace. For example, it is advantageous for an employee to be able to retrieve a document transmitted by facsimile transmission while traveling and at remote locations.

One solution to this has been the use of facsimile machines at hotels. However, there is little, if any, security provided, and the sender often does not know whether or not the recipient ever received a document transmitted by facsimile transmission, or, alternatively, whether a document transmitted by facsimile transmission was discarded at the remote location before delivery to the recipient. Indeed, one typically has no idea when receiving a document transmitted by facsimile transmission at a remote location how many other people have seen the document before it is delivered.

A somewhat better solution, at least in some situations, is to use a public facsimile machine to receive documents transmitted by facsimile transmission. However, this requires that both the sender and the recipient of the document coordinate the transmission and receipt of the document, which is often an unacceptable in today's global economy.

Several companies have addressed this problem by providing storage servers for the facsimile transmission of documents that receive such documents destined for a particular person. Then, a person dials into a server for facsimile transmission of documents identifying himself to receive documents which are downloaded to any desired facsimile machine. Some current products of this type are Public Fax by Action FAX (www.actionfax.com) and Fax-Cube (www.faxcube.com). The identification is done for example by keying in a PIN number using the telephone keypad of the facsimile machine.

Unfortunately, this solution has both security and confidentiality problems. In particular, anyone with the correct PIN number can download all the documents sent to an individual by facsimile transmission of that PIN number. It would thus be advantageous to be able to allow a remote user to securely identify and locate himself and then remotely receive any documents sent by facsimile transmission that have been staged for him using a server for facsimile transmissions.

BRIEF SUMMARY OF THE INVENTION

A system for the facsimile transmission and for the remote retrieval of documents utilizing a repository server in such system to store such documents transmitted to a remote user. Hardware security, such as a smartcard, is utilized to identify, validate, and locate the remote user upon access to the repository server of the system from a remote system for facsimile transmission to retrieve documents stored for his retrieval. After validation, waiting documents for the remote user are received and printed by the remote system.

DETAILED DESCRIPTION

Figure 1:
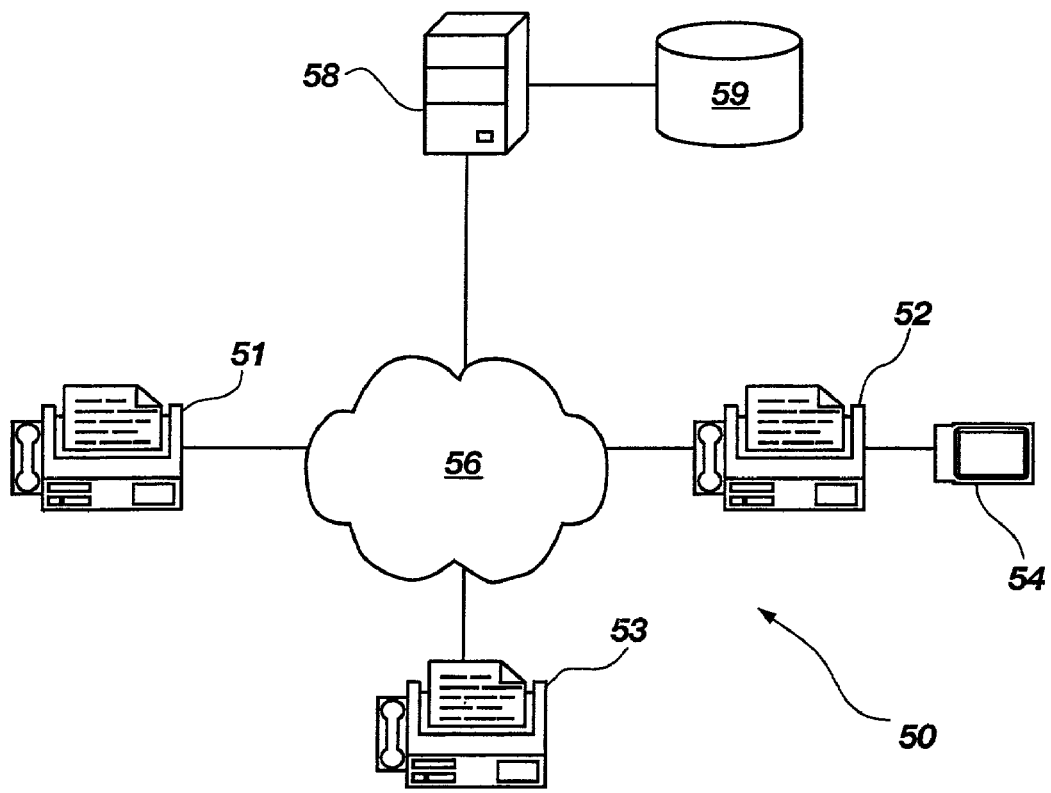
FIG. 1 is a block diagram illustrating a delivery system for documents sent by facsimile transmission providing secure remote storage and retrieval for such documents in accordance with an embodiment of the present invention.

Illustrated in drawing FIG. 1 is a block diagram illustrating a delivery system 50 for documents sent by facsimile transmission providing for the secure remote storage and retrieval of such documents, in accordance with an embodiment of the present invention. The system 50 comprises a plurality of systems 51, 52, 53 for documents sent by facsimile transmission connected via a network 56, to one or more repository servers 58 for the system 50. In drawing FIG. 1, as illustrated, one system 52 remotely delivers documents sent by facsimile transmission using the system 50. Connected to the system 52 is a suitable hardware security apparatus 54, such as a smartcard reader. Connected to the repository server 58 is a suitable non-volatile storage medium, such as a disk storage device, for the temporary storage of documents sent by facsimile transmission using the system 50.

In operation, a sender sends a document by facsimile transmission from one system 51 to a repository server 58, where it is stored for later retrieval by a specified recipient. Then, the recipient utilizes a remote system 52, where his identity is validated utilizing the attached hardware security apparatus 54. The remote system 52 is used to retrieve any waiting documents sent by facsimile transmission for a specified person from a repository server 58.

It should be understood that a recipient may retrieve documents sent by facsimile transmission from any one of a number of systems for the facsimile transmission of documents throughout the world. The use of hardware security apparatus 54 by the recipient serves to identify the recipient, to validate the identity of the recipient, and to locate the desired system that the stored documents for the recipient are to be transmitted using facsimile transmission. Thus, in the first instance, a recipient may utilize a remote system in one location, and, subsequently, use a remote system in another location. In each instance, a recipient receives documents sent by facsimile transmission that have been stored using a repository server for his retrieval. He may also transmit documents sent by facsimile transmission from a remote system 52 to the repository server 58 for later retrieval by others.

The network 56 of the present invention includes a corporate intranet that provides security through usage of a firewall. However, the present invention also includes other types of networks. For example, the network 56 may include the Internet. In such a situation, the network may include additional security to safeguard both the contents of documents sent by facsimile transmission on the network 56 and the identity of recipients. For example, additional security of the present invention includes encryption of the documents or the use of a Virtual Private Network (VPN).

Figure 2:
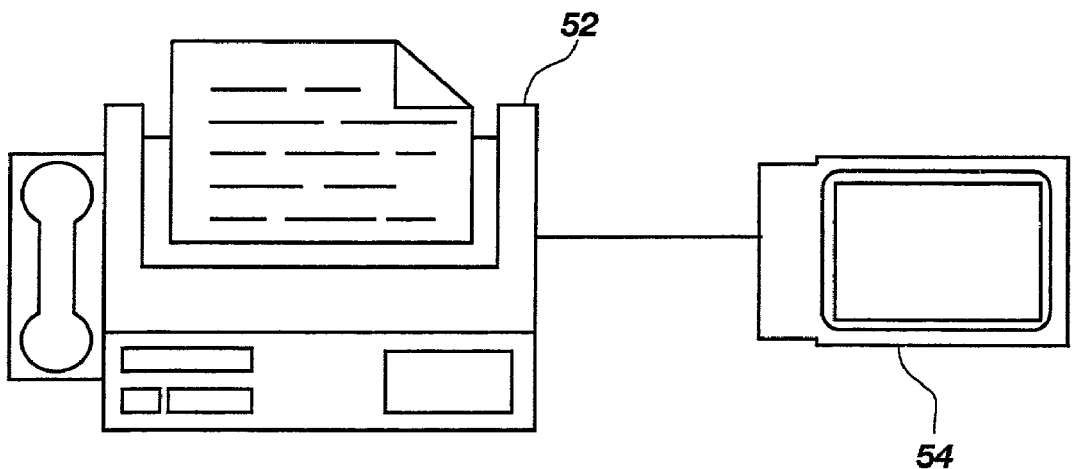
FIG. 2 is a block diagram more filly illustrating the remote system for facsimile transmission shown in FIG. 1.

Illustrated in drawing FIG. 2 is a block diagram of the remote system 52 of the present invention for the facsimile transmission of documents illustrated in drawing FIG. 1. The remote system 52 illustrated in the embodiment of the present invention includes a facsimile machine, such as a stand-alone facsimile machine, having a suitable hardware security apparatus 54, such as a smart card reader.

However, in other embodiments of the present invention, a remote system 52 may use other types of facsimile machines that provide similar functionality. For example, another type remote system 52 of the present invention includes a personal computer having an attached printer, and/or a scanner. Alternatively, such a personal computer may include multifunction printer/scanner/facsimile transmission capabilities, such as the LaserJet printer and DeskJet printer All-In-One systems sold by Hewlett-Packard Co. In another alternate embodiment, a remote system 52 of the present invention may be included in a kiosk. Also, in an embodiment of the present invention, the remote system 52 receives documents sent by facsimile transmission from a repository server 58 using a standard protocol for the facsimile transmission of documents. However, in such embodiments of the present invention, the remote system 52 can receive documents sent by facsimile transmission from a repository server 58 as e-mail or via other equivalent such apparatus and/or software.

As illustrated in drawing FIG. 2, a hardware security apparatus 54 is used to validate the identity of the user of the remote system 52. However, other suitable type security apparatus for the validation of the identity of a recipient are also included within the present invention, such security apparatus including credit card readers, magnetic card readers optical readers, face recognition systems, fingerprint recognition systems, etc. For example, a remote system 52 could identify and locate a recipient of a document sent by facsimile transmission utilizing a PIN number or user ID number having the identity of the recipient validated utilizing one of these hardware security apparatuses 54.

Figure 3:
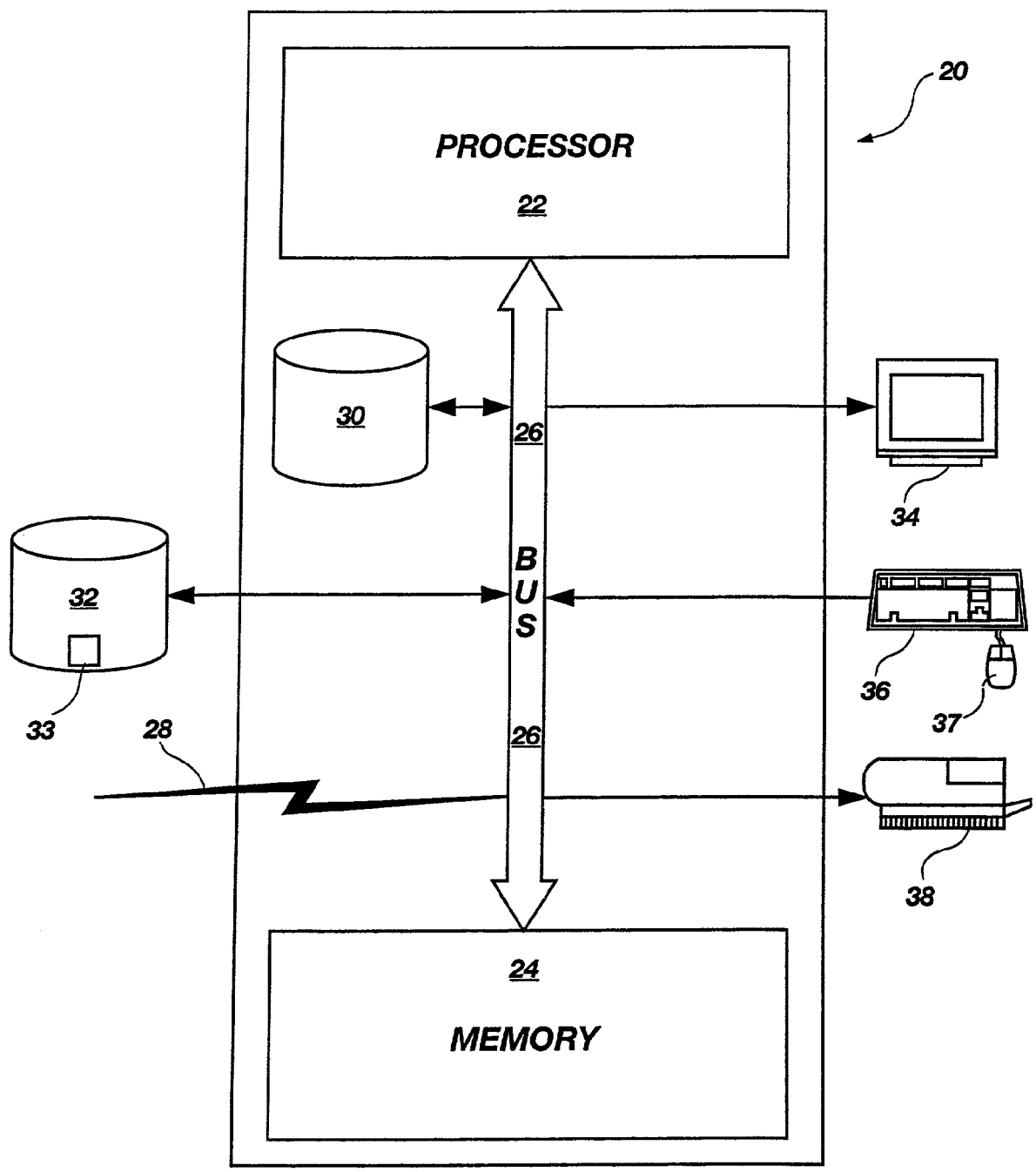
FIG. 3 is a block diagram illustrating a General Purpose Computer such as may be utilized for the repository for documents sent by facsimile transmission shown in FIG. 1.

Illustrated in drawing FIG. 3 is a block diagram for a General Purpose Computer 20 such as may be utilized for the repository server 58 shown in drawing FIG. 1. The General Purpose Computer 20 includes a processor 22 and suitable memory 24, connected by bus 26.

The memory 25 includes any suitable relatively high-speed, machine-readable medium, such as volatile memories including DRAM and SRAM, and non-volatile memories including ROM, FLASH, EPROM, EEPROM, and bubble memory. Also connected to the bus 26 is suitable secondary storage 30 apparatus, suitable external storage apparatus 32, suitable output apparatus including a monitor 34, suitable input devices including a keyboard 36 having a mouse 37, and suitable printing apparatus 38. Suitable secondary storage apparatus 30 includes suitable machine-readable media, such as hard disk drive apparatus, magnetic drum apparatus, and bubble memory apparatus. Suitable external storage apparatus 32 includes suitable machine-readable media such as floppy disk apparatus, removable hard disc drive apparatus, magnetic tape apparatus, CD-ROM apparatus, and other computer apparatus including computer apparatus connected via one or more communications line 28. The distinction between suitable secondary storage 30 and suitable external storage 32 is in describing the present invention As such, it should be appreciated that there is substantial functional overlap between such element of the present invention. Computer software such as test programs, operating systems, and user programs can be stored in a computer software storage medium, such as memory 24, secondary storage 30, and external storage 32. Executable versions of computer software 33 such as software for a repository server, can be read from a non-volatile storage medium such as external storage 32, secondary storage 30, and non-volatile memory and loaded for execution directly into volatile memory, executed directly out of non-volatile memory, or stored on the secondary storage 30 prior to loading into volatile memory for execution.

Those skilled in the art will recognize that modifications and variations additions, substitutions, and deletions are included in the present invention

What is claimed is:

1. A system for providing secure delivery of documents sent by facsimile transmission to remote users, comprising:
   a plurality of remote systems for documents sent by facsimile transmission, each remote system including:
      a security apparatus integrated within a kiosk for identifying and for validating an identity of a user, the security apparatus including identification of a user before accepting a first document sent by facsimile transmission utilizing at least one apparatus for scanning a finger print of a user, scanning a set of facial characteristics of a user, or scanning an eye of a user; and
   at least one repository server connected to the remote systems for storing at least one or more documents sent by facsimile transmission and for transmitting a first document sent by facsimile transmission to one of the remote systems at which the user has been identified and validated,
   wherein the user is able to receive the first document at any of the remote systems at which the user has been identified and validated.

2. The system in claim 1, further comprising a multifunction device operable for printing out the first document sent by facsimile transmission from the at least one repository server.

3. The system in claim 1, wherein:
   each remote system further comprises:
      scanner apparatus for reading a second document sent by facsimile transmission; and
      transmission apparatus for transmitting the second document sent by facsimile transmission to the at least one repository server.

4. The system in claim 1, wherein:
   the repository servers and the remote systems further comprise:
      a security system for providing security between the at least one repository server and the remote systems.

5. The system in claim 4, wherein:
   the security system includes encryption.

6. A repository server for documents transmitted by facsimile transmission for providing secure delivery of documents sent by facsimile transmission to users at remote locations, the repository server comprising:
   non-volatile storage medium apparatus for storing at least one document of a plurality of documents, the repository server for transmitting a set of validation information, comprising at least one of finger print information of a user, facial characteristic information of a user, or retinal identification information of a user, to any of a plurality of remote systems, each remote system incorporated within a kiosk, for validating an identity of a user of the remote systems and for transmitting the at least one document sent by facsimile transmission to the one of the remote systems at which the identity of the user has been validated
   wherein the user is able to receive the at least one document at any of the remote systems at which the user has been identified and validated.

7. A method for providing secure delivery of documents sent by facsimile transmission from a system to a remote user of a plurality of remote systems, comprising:
   providing the remote systems, each remote system part of a kiosk, for sending documents by facsimile transmission including:
      security apparatus for identifying and for validating an identity of a user, the security apparatus including identification of a user before accepting a first document sent by facsimile transmission;
   providing at least one repository server connected to the remote systems for storing at least one or more documents sent by facsimile transmission and for transmitting a first document sent by facsimile transmission to one of the remote systems at which the user has been identified and validated;
   verifying the identity of a user at one of the remote systems using the security apparatus comprising scanning a finger print of a user, scanning a set of facial characteristics of a user, or scanning an eye of a user; and
   the at least one repository server sending the first document to the remote system at which the user has been identified and validated,
   wherein the user is able to receive the at least one document at any of the remote systems at which the user has been identified and validated.

8. The method according to claim 7, further comprising:
   printing the first document for printing out the first document sent by facsimile transmission from the at least one repository server.

9. The method according to claim 7, further comprising:
   scanning a second document using scanner apparatus for reading the second document for sending by facsimile transmission; and
   transmitting the second document using transmission apparatus for transmitting the second document for sending by facsimile transmission to the at least one repository server.

10. The method according to claim 7, further comprising:
    providing security between the at least one repository server and the remote systems.

11. The method according to claim 10, further comprising:
    encrypting at least one document; and
    transmitting the at least one document using facsimile transmission.

\* \* \* \* \*

UNITED STATES PATENT AND TRADEMARK OFFICE
CERTIFICATE OF CORRECTION

| | | |
|---|---|---|
| PATENT NO. | : 7,268,899 B2 | Page 1 of 1 |
| APPLICATION NO. | : 10/062019 | |
| DATED | : September 11, 2007 | |
| INVENTOR(S) | : James D. Crumly | |

It is certified that error appears in the above-identified patent and that said Letters Patent is hereby corrected as shown below:

In column 2, line 44, delete "filly" and insert -- fully --, therefor.

In column 5, line 34, in Claim 6, after "validated" insert -- , --.

Signed and Sealed this

First Day of July, 2008

JON W. DUDAS
*Director of the United States Patent and Trademark Office*